(12) United States Patent
Goto et al.

(10) Patent No.: US 10,510,332 B2
(45) Date of Patent: Dec. 17, 2019

(54) NOISE REDUCTION APPARATUS AND JET FAN

(71) Applicant: Kabushiki Kaisha Toshiba, Tokyo (JP)

(72) Inventors: Tatsuhiko Goto, Kangawa (JP); Akihiko Enamito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/111,459

(22) Filed: Aug. 24, 2018

(65) Prior Publication Data
US 2019/0287510 A1  Sep. 19, 2019

(30) Foreign Application Priority Data
Mar. 15, 2018 (JP) .................................. 2018-47746

(51) Int. Cl.
| G10K 11/178 | (2006.01) |
| F04D 29/66 | (2006.01) |
| F04D 29/52 | (2006.01) |
| F02K 3/00 | (2006.01) |
| F04D 29/54 | (2006.01) |

(52) U.S. Cl.
CPC .......... *G10K 11/17823* (2018.01); *F02K 3/00* (2013.01); *F04D 29/522* (2013.01); *F04D 29/665* (2013.01); *G10K 11/17825* (2018.01); *F04D 29/542* (2013.01); *F05D 2220/36* (2013.01); *F05D 2260/962* (2013.01); *G10K 2210/109* (2013.01); *G10K 2210/3011* (2013.01); *G10K 2210/3044* (2013.01)

(58) Field of Classification Search
USPC .......... 381/13, 71.7, 71.8, 71.14, 71.1, 71.5, 381/337, 338
See application file for complete search history.

(56) References Cited

U.S. PATENT DOCUMENTS 4,585,391 A * 4/1986 Vuillet .................... B64C 27/82
                                                415/121.3
5,478,199 A   12/1995 Gliebe
(Continued)

FOREIGN PATENT DOCUMENTS

| JP | H1-159406 A | 6/1989 |
| JP | H1-128000 U | 8/1989 |

(Continued)

OTHER PUBLICATIONS

Ohta et al., "Direct Fully Adaptive Active Noise Control Algorithms without Identification of Secondary Path Dynamics," Proceedings of the 2002 IEEE International Conference on Control Applications (Sep. 18-20, 2002), pp. 453-458.

(Continued)

*Primary Examiner* — Yosef K Laekemariam
(74) *Attorney, Agent, or Firm* — Finnegan, Henderson, Farabow, Garrett & Dunner, L.L.P.

(57) ABSTRACT

According to one embodiment, a noise reduction apparatus includes a speaker, a generator and a controller. The speaker outputs control sound. The generator generates self-excited sound. The controller controls a phase and an amplitude of the control sound to reduce noise generated from a noise source, based on the control sound and the self-excited sound that is synchronized with the control sound.

8 Claims, 7 Drawing Sheets

(56) References Cited

U.S. PATENT DOCUMENTS

| | | | |
|---|---|---|---|
| 5,515,444 A * | 5/1996 | Burdisso | G10K 11/178 381/71.5 |
| 5,778,081 A | 7/1998 | Patrick | |
| 6,201,872 B1 | 3/2001 | Hersh et al. | |
| 9,169,750 B2 | 10/2015 | Disimile | |
| 2018/0204561 A1 | 7/2018 | Goto et al. | |
| 2019/0088244 A1 | 3/2019 | Goto et al. | |

FOREIGN PATENT DOCUMENTS

| | | |
|---|---|---|
| JP | H11-502032 A | 2/1999 |
| JP | 2003-83296 A | 3/2003 |
| JP | 2003-233133 A | 8/2003 |
| JP | 2006-211770 A | 8/2006 |
| JP | 2008-292743 A | 12/2008 |
| JP | 2014-228759 A | 12/2014 |
| JP | 2018-111461 A | 7/2018 |
| JP | 2019-53197 A | 4/2019 |

OTHER PUBLICATIONS

Honda et al., "Active Minimization of Blade Rotational Noise from an Axial Fan," Transactions of the Japan Society of Mechanical Engineers (Part C) (1993), 59:228-233.

Aoki et al., "Theoretical study on active control of rotational noise source using discrete ring sound source," Journal of the Acoustical Society of Japan (2004), 60:639-645.

* cited by examiner

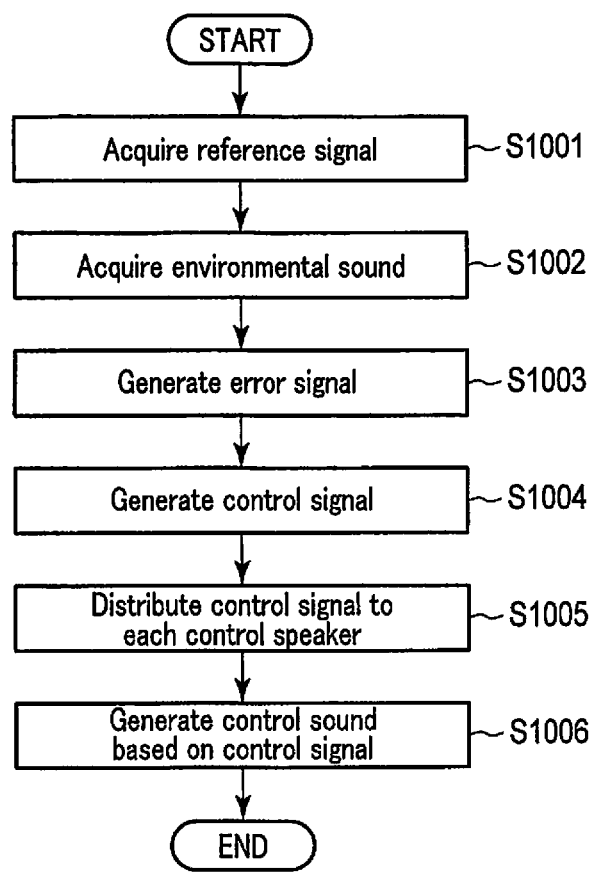
F I G. 10

NOISE REDUCTION APPARATUS AND JET FAN

CROSS-REFERENCE TO RELATED APPLICATIONS

This application is based upon and claims the benefit of priority from the prior Japanese Patent Application No. 2018-047746, filed Mar. 15, 2018, the entire contents of which are incorporated herein by reference.

FIELD

Embodiments described herein relate generally to a noise reduction apparatus and a jet fan.

BACKGROUND

Active sound cancellation or active noise control (ANC) is known as noise countermeasures against a rotation sound source caused by rotor blades or a rotation sound source caused by interference of rotor blades and stator blades. The active noise control is a technique of reducing noise by causing a speaker to output control sound that has the same amplitude and the reverse phase relative to the noise.

However, the active noise control against a continuous rotation sound source simulates the rotation sound source by speakers arranged in a discrete manner and thus requires many speakers. This increases the total weight of the active noise reduction apparatus including the speakers and requires a space for installation, which makes it difficult to mount the apparatus on, for example, a jet engine, etc.

BRIEF DESCRIPTION OF THE DRAWINGS

FIG. 10 is a flowchart showing noise reduction processing by the noise reduction system according to the first embodiment;

DETAILED DESCRIPTION

In general, according to one embodiment, a noise reduction apparatus includes a speaker, a generator and a controller. The speaker outputs control sound. The generator generates self-excited sound. The controller controls a phase and an amplitude of the control sound to reduce noise generated from a noise source, based on the control sound and the self-excited sound that is synchronized with the control sound.

In the following description, a noise reduction apparatus and a jet fan according to the present embodiment will be described in detail with reference to the accompanying drawings. In the embodiments below, it is assumed that portions denoted by the same reference symbols perform similar operations, and overlapping explanations will be omitted as appropriate.

First Embodiment

A noise reduction apparatus according to the first embodiment will be described with reference to FIG. 1A and FIG. 1B.

Figure 1A:
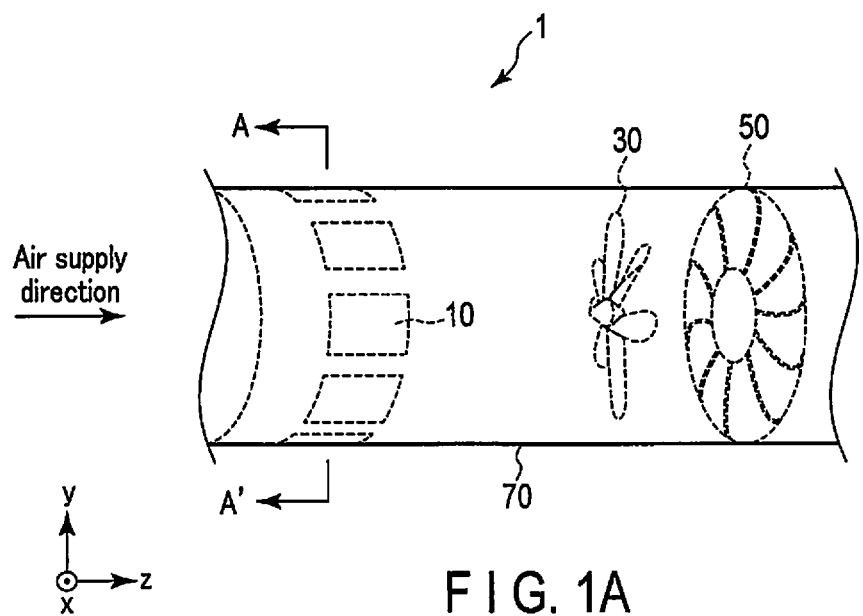
FIG. 1A is a schematic view showing a duct fan provided with noise reduction apparatuses according to a first embodiment.

FIG. 1A is a schematic view showing an example of a duct fan 1 provided with a noise reduction apparatus 10 according to the first embodiment. FIG. 1B is a cross-sectional view showing the duct fan 1 cut along the A-A' line illustrated in FIG. 1A.

The duct fan 1 includes a plurality of noise reduction apparatuses 10, a rotor blade 30, a stator blade 50, and a duct 70.

The noise reduction apparatuses 10 are arranged inside the duct 70 and in front of the rotor blade 30 (air supply side). The noise reduction apparatuses 10 perform processing to reduce noise (blade tip noise) generated by rotation of the rotor blade 30, by synthesized sound of self-excited sound generated by a self-excited sound generation structure and control sound output from a speaker. Details of the noise reduction apparatus 10 will be described later with reference to FIG. 4 and the subsequent figures.

The rotor blade 30 includes a plurality of blades provided to be rotatable around a rotation axis. The rotor blade 30 rotates around the rotation axis to generate airflow in the duct 70 and to also generate noise. Here, airflow is generated along the air supply direction.

The stator blade 50 includes a plurality of blades fixed to the duct 70 by being embedded in the inner wall of the duct 70 or a casing. In this example, the stator blade 50 is arranged behind the rotor blade 30, but it may be arranged in front of the rotor blade 30. The stator blade 50 functions as straightening airflow.

The duct 70 is a housing including the plurality of noise reduction apparatuses 10, the rotor blade 30, and the stator blade 50. The duct 70 is assumed to have a cylindrical shape here, but is not limited to this and may have a polygonal column shape.

Figure 1B:
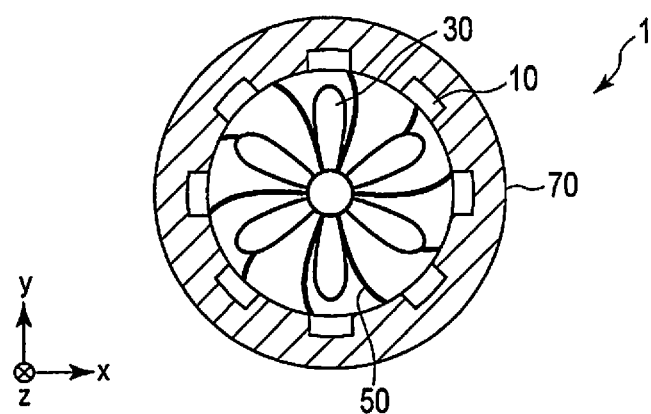
FIG. 1B is a cross-sectional view of the duct fan cut along an A-A' line illustrated in FIG. 1A.

FIG. 1A and FIG. 1B illustrate the example in which one rotor blade 30 and one stator blade 50 are provided, but a plurality of rotor blades 30 and a plurality of stator blades 50 may be provided.

Next, the concept of self-excited sound used in the noise reduction apparatus 10 according to the first embodiment will be described with reference to FIG. 2 and FIG. 3.

The self-excited sound is fluid sound generated when fluid (air in this embodiment) passes through a predetermined structure. As the predetermined structure, the present embodiment assumes an edge structure, a cavity structure, and the like, but the structures are not limited to these, and structures generating self-excited noise are applicable to the noise reduction apparatus according to the present embodiment.

Figure 2:
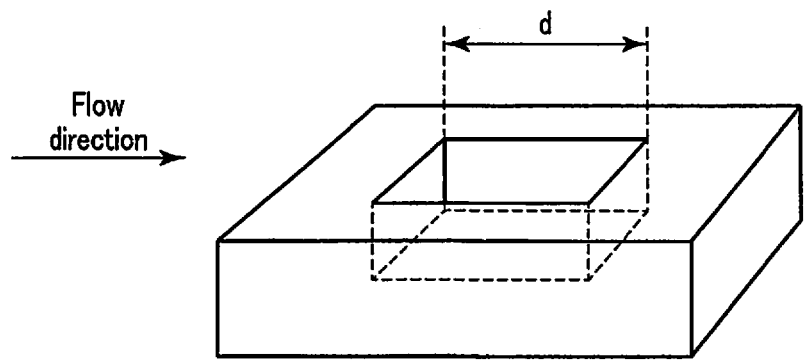
FIG. 2 shows a case where a self-excited sound generation structure is a cavity structure.

FIG. 2 shows the case where the self-excited sound generation structure is a cavity structure.

If a length of the cavity structure parallel to the flow of air is defined as d, the frequency f of the self-excited sound is expressed as follows.

$$f=1/(d/U+d/c)$$

Here, c denotes a sound velocity, and U denotes a flow velocity. If the flow velocity U is sufficiently slower as compared to the sound velocity c, f=U/d.

Figure 3:
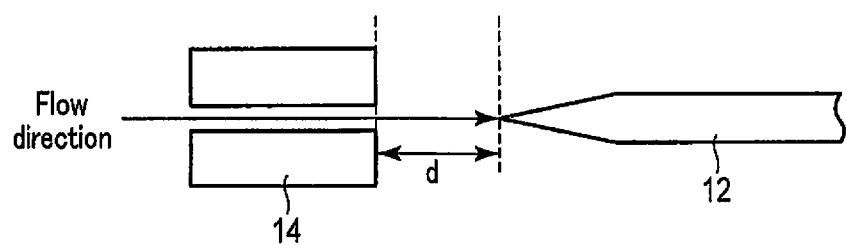
FIG. 3 shows a case where a self-excited sound generation structure is an edge structure.

On the other hand, FIG. 3 shows the case where the self-excited sound generation structure is an edge structure. For the edge structure, if the distance between the distal end of the edge 12 and the member 14 present on the extension of the distal end (i.e., the distance with respect to the jet outlet) is defined as d, the frequency f of the self-excited sound is expressed as follows.

$$f=cU/(d(2c+U))$$

Here, if the flow velocity U is sufficiently slower than the sound velocity c, f=U/2d. In other words, for both the cavity structure and the edge structure, the frequency f of the self-excited sound is expressed by the following equation (1).

$$f=k1\times(U/d) \quad (1)$$

For the cavity structure, k1=1, and for the edge structure, k1=½.

As shown in the equation (1), the frequency f of the self-excited sound is generally proportional to the flow velocity U, and thus the frequency f of the self-excited sound changes in accordance with the change of the flow velocity U. The flow velocity U of airflow generated by rotation of the rotor blade 30 is expressed by equation (2) when the rotation velocity of the rotor blade 30 is Ω {rpm}.

$$U=k2\times\Omega \quad (2)$$

Here, k2 is a coefficient for which a shape of the duct and the like are considered, and k2 is a constant number determined by separately calculating the relationship between the flow velocity U and the rotation velocity Ω. That is, the flow velocity U is proportional to the rotation velocity Ω of the rotor blade 30. Thus, the length d in the cavity structure and the distance d in the edge structure may be determined to satisfy the following equation (3).

$$k1\times d2/d=B/60 \quad (3)$$

Here, B denotes the number of blades of the rotor blade 30. In other words, based on the flow velocity, the rotation velocity of the rotor blade 30, and the number of blades of the rotor blade 30, the shape of the self-excited sound generation structure such as the cavity structure or the edge structure is determined.

The frequency f of the self-excited sound can be expressed by equation (4) based on equation (1) to equation (3).

$$f=B(\Omega/60) \quad (4)$$

That is, the frequency f of the self-excited sound changes according to the frequency of noise which changes based on the rotation velocity Ω of the rotor blade 30.

Next, an example of the noise reduction apparatuses 10 using the cavity structure among the above-described self-excited sound generation structures will be described with reference to FIG. 4.

Figure 4:
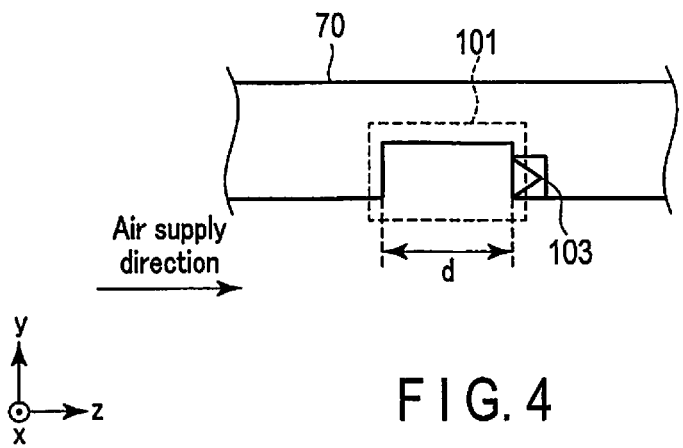
FIG. 4 shows an example of the noise reduction apparatus using the cavity structure.

The noise reduction apparatus 10 illustrated in FIG. 4 includes a self-excited sound generator 101 and a control speaker 103.

The self-excited sound generator 101 has a cavity structure and generates self-excited sound. The cavity structure includes a cavity, and is a mechanical structure adjusted so that the self-excited sound is generated by the cavity. The cavity structure may be provided integrally in the duct 70, or may be attached to a duct 70 that is prepared separate from the duct 70. In the self-excited sound generator 101, the cavity is adjusted so that the length of the cavity structure parallel to the air supply direction (z direction) becomes "d" described above. Any length may be set for two elements other than the length d of the cavity that determine the capacity of the cavity, i.e., the length in the direction (X direction) vertical to the air supply direction and the depth (y direction) of the cavity.

A control speaker 103 is, for example, a piezo film speaker, and outputs the control sound that is set in accordance with the control signal. The control speaker 103 is arranged at the noise source side (here, rotor blade 30 side) relative to the self-excited sound generator 101. At this time, the control speaker 103 is arranged so that the control sound is output inside the cavity and to the front side in the air supply direction. Note that the control speaker 103 may be embedded in the duct 70 as illustrated in FIG. 4, or may be fixed to a part of the inner wall of the duct 70.

The self-excited sound generated by the self-excited sound generator 101 is affected by the lock-in phenomenon. The lock-in phenomenon is a phenomenon in which self-excited sound is synchronized with sound output from an external sound source. That is, the frequency of the self-excited sound (cavity tone) generated from the cavity structure is synchronized with the frequency of the control sound output from the control speaker 103. In other words, controlling the frequency, the phase, and the amplitude of the control sound from the control speaker 103 can indirectly control the frequency, the phase, and the amplitude of the self-excited sound.

Next, another example of the noise reduction apparatus 10 using the cavity structure will be described with reference to FIG. 5.

Figure 5:
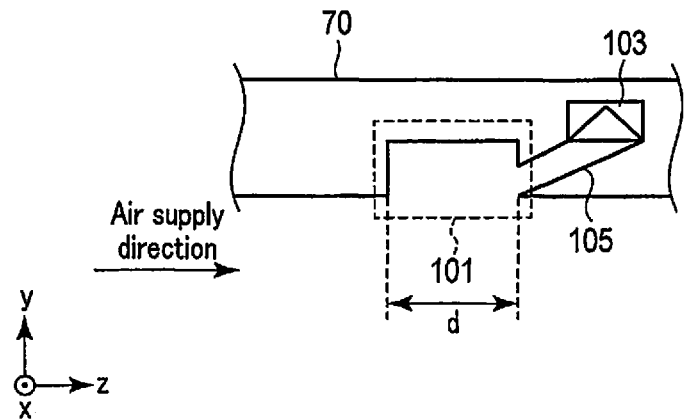
FIG. 5 shows another example of the noise reduction apparatus using the cavity structure.

The noise reduction apparatus 10 illustrated in FIG. 5 includes the self-excited sound generator 101, the control speaker 103, and an acoustic transmission path 105.

The acoustic transmission path 105 is a transmission tube formed to output the control sound from the control speaker 103 in the cavity. Thus, like FIG. 4, the self-excited sound can be synchronized with the control sound by the lock-in phenomenon. The acoustic transmission path 105 may be made of the same material as that of the duct 70, or may be made of a metal such as aluminum and copper or a resin such as vinyl chloride.

With the acoustic transmission path 105 as illustrated in FIG. 5, the control speaker 103 does not have to be present near the cavity. In other words, the control speaker 103 may be arranged at a rear end away from the cavity. Moreover, the direction of the control speaker 103 is not limited as long as the acoustic transmission path 105 is in the cavity and is open to the front side in the air supply direction. Namely, even if the control speaker 103 cannot be embedded due to the thickness of the duct 70, the control sound from the control speaker 103 is output inside the cavity by using the acoustic transmission path 105. That is, using the acoustic transmission path 105 improves a flexibility of arrangement of the control speaker 103.

Next, an example of the noise reduction apparatus 10 using the edge structure among the self-excited sound generation structures will be described with reference to FIG. 6.

Figure 6:
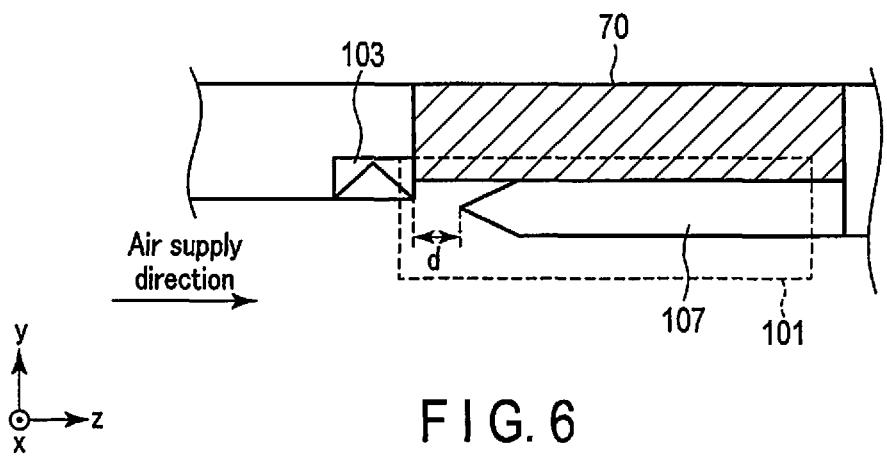
FIG. 6 shows an example of the noise reduction apparatus using the edge structure.

The noise reduction apparatus 10 illustrated in FIG. 6 includes the self-excited sound generator 101 and the control speaker 103.

The self-excited sound generator 101 has an edge structure and generates self-excited sound. The edge structure includes an edge 107, and is a mechanical structure adjusted so that the self-excited sound is generated by the edge 107. The edge structure may be provided integrally in the duct 70, or may be attached to a duct 70 that is prepared separate from the duct 70. The self-excited sound generator 101 is arranged at the noise source side (here, rotor blade 30 side) relative to the control speaker 103. The self-excited sound generator 101 is formed by arranging the edge 107 at a position where a distance between the edge 107 and the control speaker 103 is "d". A region from the edge 107 to the outer wall of the duct 70 (a shaded area in FIG. 6) may be hollow, or filled with a resin, etc.

The material of the edge 107 and the angle and shape of the edge 107 are not limited as long as the self-excited sound is generated by the edge.

The control speaker 103 is arranged at the air supply side (front) relative to the self-excited sound generator 101. The control speaker 103 is arranged to output the control sound toward the inside of the duct, e.g., toward the radial direction (center axis direction) of the duct 70.

For the edge structure as well, the self-excited sound (edge tone) generated from the edge structure is synchronized with the frequency of the control sound output from the control speaker 103 by the lock-in phenomenon. Thus, if the self-excited sound generator 101 has the edge structure, controlling the frequency of the control sound from the control speaker 103 can indirectly control the frequency of the self-excited sound.

Next, another example of the noise reduction apparatus 10 using the edge structure will be described with reference to FIG. 7.

Figure 7:
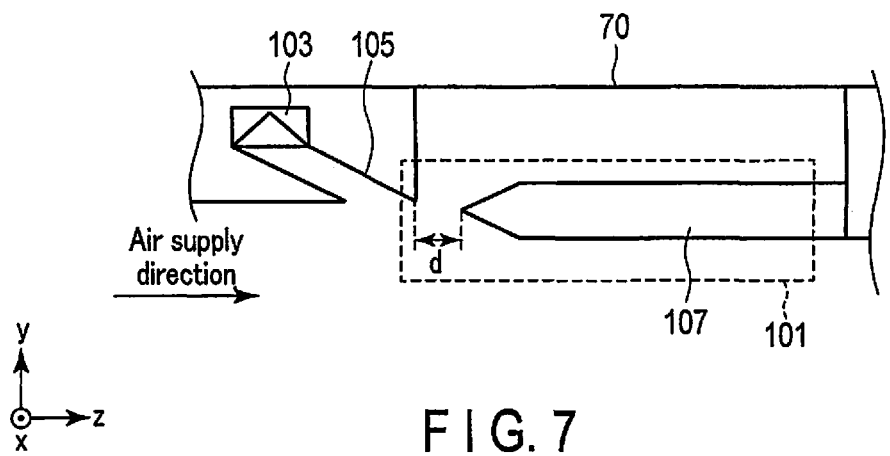
FIG. 7 shows another example of the noise reduction apparatus using the edge structure.

The noise reduction apparatus 10 illustrated in FIG. 7 includes the self-excited sound generator 101, the control speaker 103, and the acoustic transmission path 105.

Like the cavity structure illustrated in FIG. 5, if the self-excited sound generator 101 has the edge structure, the direction and the arrangement of the control speaker 103 are not limited as long as the acoustic transmission path 105 is open to the radial direction of the duct 70.

Next, a noise reduction system using the noise reduction apparatus 10 according to the first embodiment will be described with reference to FIG. 8 to FIG. 10.

Figure 8:
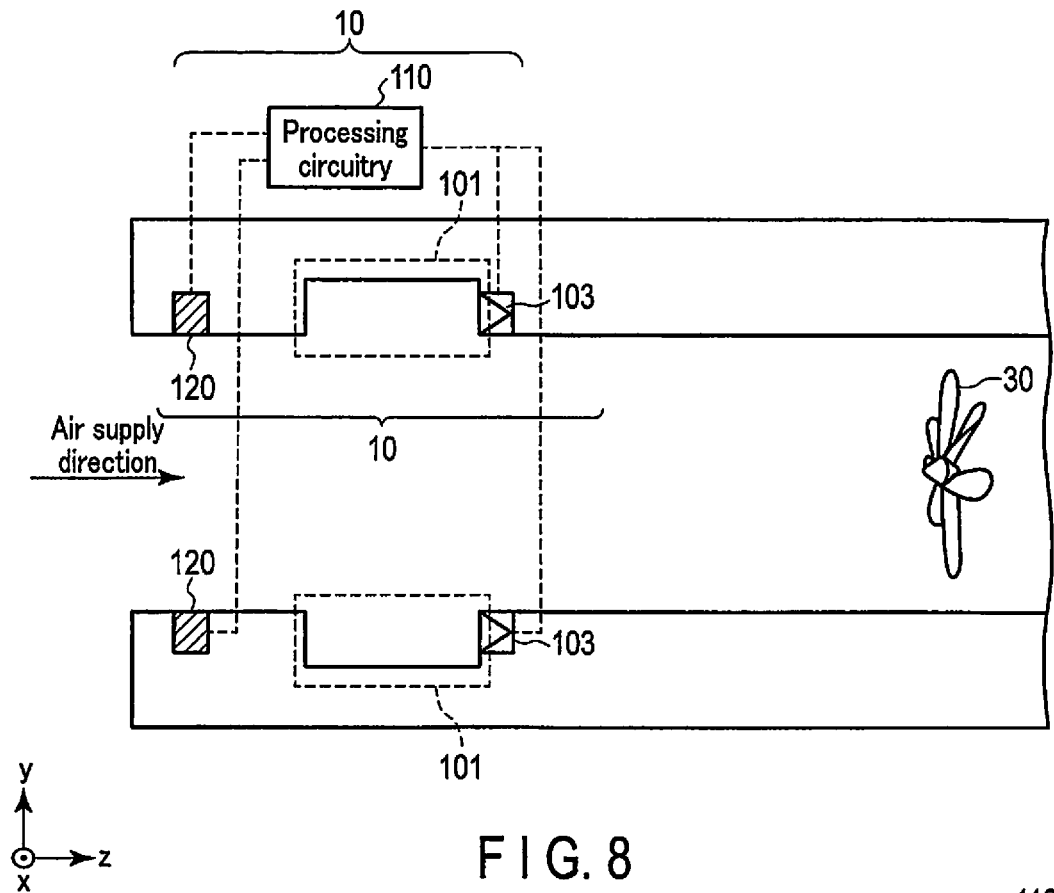
FIG. 8 is a schematic view showing a noise reduction system according to the first embodiment.
Figure 9:
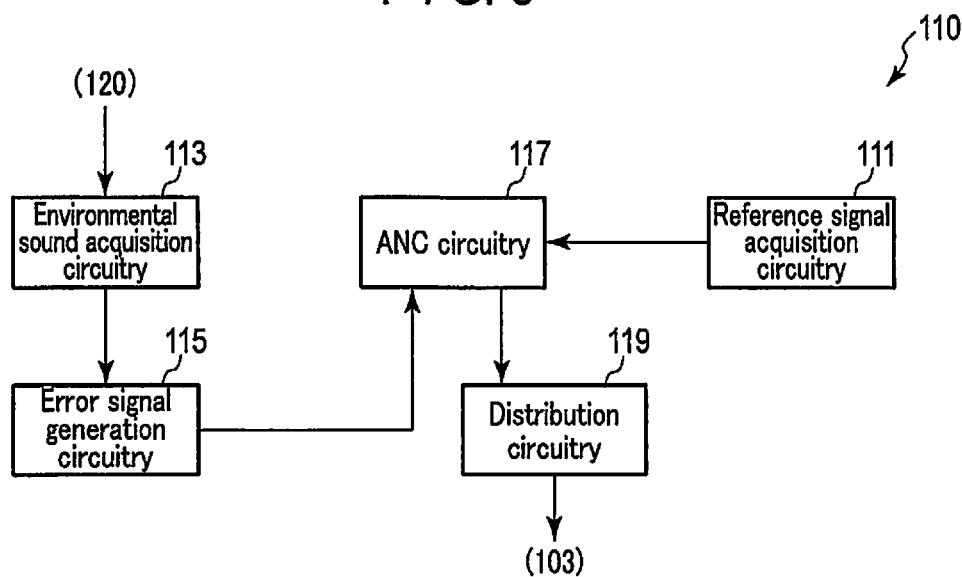
FIG. 9 is a block diagram showing a processing circuitry of the noise reduction system according to the first embodiment.

FIG. 8 is a schematic view showing a plurality of noise reduction apparatuses 10 using the cavity structure arranged inside the duct fan 1. FIG. 8 more specifically illustrates the noise reduction apparatuses 10 as compared to FIG. 1.

The noise reduction system includes a plurality of noise reduction apparatuses 10 and a processing circuitry 110. Each noise reduction apparatus 10 includes a microphone 120 and a control speaker 103.

In the noise reduction control using the lock-in phenomenon of self-excited sound, it is not possible to identify, in advance, secondary path characteristics of the self-excited sound. Thus, identification of secondary path characteristics is executed online separately, or an algorithm that does not require identification of secondary path characteristics such as a direct method constituting secondary paths during the control processing may be used. For the direct method, general techniques may be used, and a detailed explanation is omitted.

As illustrated in FIG. 8, a plurality of noise reduction apparatuses 10 are provided along the circumferential direction of the inner wall of the duct 70 including the rotor blade 30 which is the noise sound source, and in front of or behind the rotor blade 30 in the tube axis direction of the duct 70. The number of noise reduction apparatuses 10 is "$2 \times M_{min} + 1$" or more, preferably "$2 \times M_{min} + 3$" or more. Here, M is determined to satisfy the equation (5).

$$M = B \times x + V \times k \tag{5}$$

Here, B is the number of blades of the rotor blade 30, x is a target noise reduction order, V is the number of blades of the stator blade 50, and k is a discretionary integer. "$M_{min}$" described above is the minimum value of the equation (5). And "$M_{min}$" is the selected lobe mode attenuated by the noise reduction apparatuses 10.

The microphone 120 of each noise reduction apparatus 10 is arranged farthest from the rotor blade 30 as compared to the self-excited sound generator 101 and the control speaker 103.

On the other hand, the self-excited sound generator 101 and the control speaker 103 of each noise reduction apparatus 10 have different positional relationships depending on the structure of the self-excited sound generator 101. For example, if the self-excited sound generator 101 has a cavity structure as illustrated in FIG. 8, the control speaker 103 is arranged at the rear side of the air supply direction (rotor blade 30 side) relative to the self-excited sound generator 101. If the self-excited sound generator 101 has an edge structure, the control speaker 103 is arranged at the front side of the air supply direction relative to the self-excited sound generator 101.

Note that since the control sound is based on the sound pressure of noise acquired by the microphone 120, it is preferable that the noise reduction apparatus 10 is arranged away from the rotor blade 30 that is the noise source. This is because the further away the noise reduction apparatus 10 is from the rotor blade 30 that is the noise source, the lower the sound pressure of noise acquired by the microphone 120 is, and the sound pressure of the control sound output from the control speaker can be lowered.

In the example of FIG. 8, the plurality of noise reduction apparatuses 10 are arranged in front of the rotor blade 30 in the air supply direction; besides this configuration, the plurality of noise reduction apparatuses 10 may be provided behind the rotor blade 30.

Next, a block diagram of the processing circuitry 110 of the noise reduction system will be described with reference to FIG. 9.

The processing circuitry 110 includes a reference signal acquisition circuitry 111, an environmental sound acquisition circuitry 113, an error signal generation circuitry 115, an active noise control circuitry 117 (hereinafter, an ANC circuitry 117), and a distribution circuitry 119.

The reference signal acquisition circuitry 111 acquires a reference signal including information on the rotor blade 30 which is the noise source. Specifically, the information on the rotor blade 30 is a rotor blade rotation angle or a rotation pulse measured using a pulse sensor, an encoder, or a fiber sensor.

The environmental sound acquisition circuitry 113 acquires environmental sound collected by a plurality of microphones 120 arranged in the duct 70.

The error signal generation circuitry 115 generates an error signal by calculating a phase delay sum of the environmental sound in consideration of a phase difference of the environmental sound acquired by the plurality of microphones 120.

The ANC circuitry 117 acquires the reference signal from the reference signal acquisition circuitry 111, and the error signal from the environmental sound acquisition circuitry 113. The ANC circuitry 117 generates a control signal for causing the control speaker 103 to output the control sound for minimizing the error signal. Specifically, the ANC circuitry 117 generates a control signal for causing the control speaker 103 to output the control sound so that the synthesized sound wave of the control sound and the self-excited sound that is synchronized with the control sound by the lock-in phenomenon has the same amplitude and the reverse phase relative to the sound waves of noise. Since the self-excited sound is used, the sound pressure of the control sound itself generated from the control speaker 103 can be smaller than the sound pressure of the noise.

When the frequency of the control sound is calculated, the rotation velocity and the number of blades of the rotor blade 30 are used. The rotation velocity may be calculated by the rotor blade rotation angle or the rotation pulse, for example. For the number of blades, information on the number of blades is acquired in advance, or if the information is included in the reference signal, extraction may be made from the reference signal.

The distribution circuitry 119 receives the control signal from the ANC circuitry 117. The distribution circuitry 119 distributes a phase-shifted control signal suitable to each control speaker 103, in consideration of the phase difference of the control sound generated from the plurality of control speakers 103.

The processing circuitry 110 is, for example, a processor, and may be arranged inside duct 70 or outside the duct 70 in a manner so that the control signal can be transmitted to each control speaker 103 through wiring or wirelessly.

The processing circuitry 110 may be formed integrally with a specified control speaker 10.

Next, the noise reduction processing by the noise reduction system according to the first embodiment will be described with reference to the flowchart shown in FIG. 10.

In step S1001, the reference signal acquisition circuitry 111 acquires information on the rotor blade 30 as a reference signal.

In step S1002, the environmental sound acquisition circuitry 113 acquires environmental sound from each of the plurality of microphones 120. That is, the environmental sound includes the synthesized sound of the control sound and the self-excited sound, and noise.

In step S1003, the error signal generation circuitry 115 generates the error signal. A phase shift amount of each microphone 120 determined by the error signal generation circuitry 115, i.e., delay time $delay_i$ may be determined based on the following equations (6-1) and (6-2).

$$delay_i = 2\pi i / \Omega L_m \quad (6\text{-}1)$$

$(M_{min} = B^*x)$ $$delay_i = 2\pi i / \Omega L_m * (M_{min}/Bx) \quad (6\text{-}2)$$

$(M_{min} \neq B^*x)$

Here, i denotes the microphone number incremented in a direction opposite to the rotation direction of the rotor blade 30, $\Omega$ denotes the rotation velocity of the rotor blade 30, and $L_m$ denotes the number of microphones 120.

In step S1004, the ANC circuitry 117 performs active noise control for minimizing the error signal, and generates a control signal. That is, the control signal is a signal for causing the control speaker 13 to output the control sound that reduces the sound pressure of noise at the microphone 120 position.

In step S1005, the distribution circuitry 119 distributes the control signal to each control speaker 103. Note that the phase shift amount of the control speaker 103 determined in the distribution circuitry 119, i.e., delay time $delay_i$, may be determined based on the following equations (7-1) and (7-2).

$$delay_i = 2\pi i / \Omega L_c \quad (7\text{-}1)$$

$(M_{min} = B^*x)$ $$delay_i = 2\pi i / \Omega L_c * (M_{min}/Bx) \quad (7\text{-}2)$$

$(M_{min} \neq B^*x)$

Here, i denotes the control speaker number incremented in the rotation direction of the rotor blade 30.

$L_c$ denotes the number of control speakers.

In step S1006, each control speaker 103 outputs the control sound. Furthermore, the self-excited sound is generated by the self-excited sound generator 101 based on airflow by rotation of the rotor blade. In this case, the generated self-excited sound is synchronized with the control sound by the lock-in phenomenon to thereby form control sound (synthesized sound) having the sound pressure generated from the control speaker 103 and more.

The processing circuitry 110 repeats the processing from step S1001 to step S1006 during the rotation of the rotor blade 30. The processing circuitry 110 may control the frequency, the phase, and the amplitude of the control signal in a manner that the synthesized sound of the control sound and the self-excited sound is used to cancel (reduce) noise from the rotor blade 30.

According to the first embodiment described above, the noise reduction apparatus 10 including the control speaker 103 and the self-excited sound generator 101 is arranged near the noise source such as the rotor blade 30. The self-excited sound generated by the self-excited sound generator 101 is synchronized with the frequency of the control sound from the control speaker 103 by the lock-in phenomenon. In other words, the control sound generated from the control speaker 103 can be amplified. Thereby, the control sound necessary for the noise reduction control is formed by the synthesized sound of the sound generated from the control speaker 103 and the self-excited sound, and thus the volume of the control sound generated from the control speaker 103 itself can be small. As a result, it is possible to downsize and reduce the weight of the control speaker 103 without losing noise reduction control ability, and to downsize and reduce the weight of the entire noise reduction apparatus 10.

Second Embodiment

While the first embodiment assumes a self-excited sound generation circuitry using self-excited sound, the second embodiment assumes a self-excited sound generation circuitry using a resonance phenomenon.

The noise reduction apparatus according to the second embodiment will be described with reference to FIG. 11 and FIG. 12.

Figure 11:
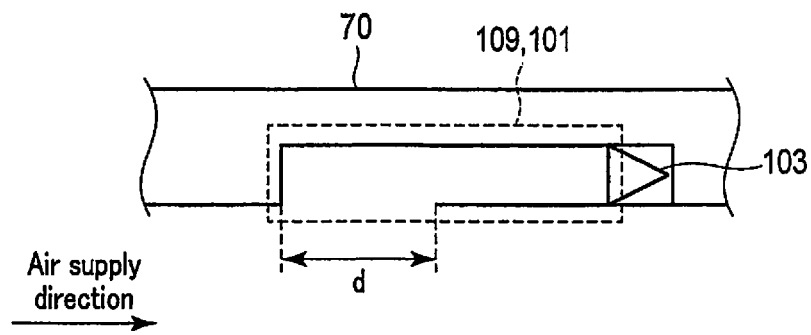
FIG. 11 shows a cavity tone use type control speaker using a resonant phenomenon according to a second embodiment.

FIG. 11 illustrates the self-excited sound generator 101 having a cavity structure using a resonance phenomenon, and the control speaker 103. The cavity formed in the duct 70 is a resonant space 109.

The control speaker 103 is arranged at the end of the resonant space 109, i.e., the position farthest from the air supply side in the resonant space 109 (the rotor blade 30 side (not shown)).

Figure 12:
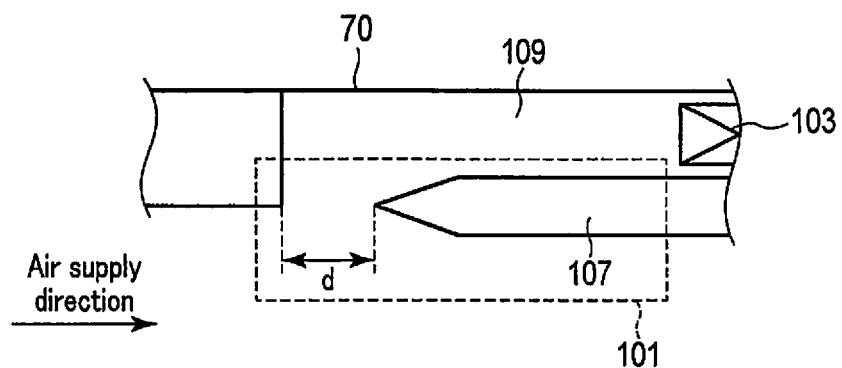
FIG. 12 shows an edge tone use type control speaker using a resonant phenomenon according to the second embodiment.

FIG. 12 illustrates the self-excited sound generator 101 having an edge structure using a resonant phenomenon, and the control speaker 103. The space surrounded by the edge structure 107, the duct 70, and the control speaker 103 illustrated in FIG. 12 is a resonant space 109. The control speaker 103 is arranged at the position farthest from the air supply side in the resonant space 109 (the rotor blade 30 side (not shown)).

The frequency of the self-excited sound by the cavity structure or the edge structure depends on the resonant frequency generated by the resonant space. Thus, the frequency of the self-excited sound does not change in accordance with the rotation velocity. Thus, if the frequency (rotation velocity) of noise is determined in advance, by adjusting the resonant space dimension and the distance d so that the resonant frequency corresponds to the frequency of noise, the noise reduction control using the lock-in phenomenon like the first embodiment can be achieved.

Even in a case where the frequency of noise changes, the resonant frequency can be adjusted as long as it is a movable structure in which the size of the resonant space formed in the duct 70 can be changed. Thus, with the movable structure, it is possible to perform the noise reduction control following the change of the frequency of noise in a manner similar to the first embodiment.

According to the second embodiment described above, the resonant phenomenon is used instead of the self-excited sound lock-in phenomenon to amplify the control sound, which makes it possible to downsize and reduce the weight of the control speaker in a manner similar to the first embodiment, and to downsize and reduce the weight of the entire noise reduction apparatus.

Figure 13:
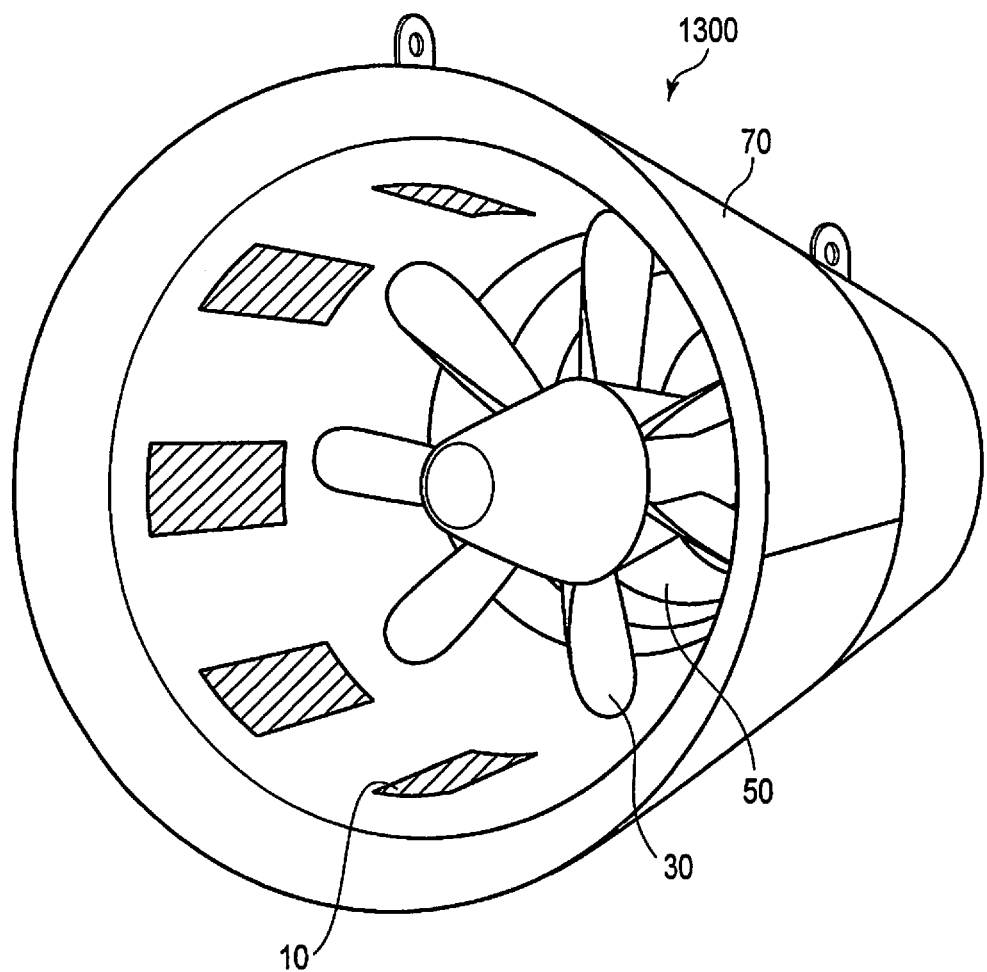
FIG. 13 is a conceptual diagram showing an example in which the noise reduction apparatus is applied to a jet fan.

FIG. 13 illustrates an example, as a concrete example of the duct fan 1 described above, in which the above-described noise reduction apparatus 10 is applied to a jet fan.

The jet fan illustrated in FIG. 13 includes a plurality of noise reduction apparatuses 10, a rotor blade 30, a stator blade 50, and a duct 70.

In a general jet fan, the length of the duct 70 behind the rotor blade 30 is longer, and thus noise is smaller at a rear side. In contrast, the length of the duct 70 is shorter in front of the rotor blade 30, and thus the noise in front of the rotor blade 30 is considered to be a problem. Thus, in the example of FIG. 13, a plurality of noise reduction apparatuses 10 according to the present embodiment are arranged in front of the rotor blade 30 at approximately equal intervals in the circumferential direction of the duct 70.

Note that the noise reduction apparatus 10 according to the present embodiment can be used for a jet engine, a turbine to which the duct is connected, or the like, without limitation to the jet fan.

The instructions shown in the processing sequence in the above-described embodiment may be executed based on a software program. The same effect as that of the above-described detection apparatus may be obtained by storing the program in a general-purpose computer system in advance, and then reading the program. The instruction described in the above-mentioned embodiment may be recorded as a computer-executable program in a magnetic disk (flexible disk, hard disk, etc.), an optical disk (CD-ROM, CD-R, CD-RW, DVD-ROM, DVD±R, DVD±RW, Blu-ray (registered trademark) Disc, etc.), a semiconductor memory, or a similar type of recoding medium. Any recording format may be employed as long as the format is readable in a computer or an embedded system. The same operation as that of the detection apparatus of the above-described embodiment may be realized when the computer reads the program from the recording medium and the instructions described in the program is executed by the CPU based on the program. It is a matter of course that the computer may acquire and read the program through a network. In addition, an OS (operation system) running on the computer, a database management software, an MW (middleware) such as a network may perform some of the respect processes based on the instruction of the program stored in the computer or the embedded system from the recording medium for realizing this embodiment. Furthermore, the recording medium in this embodiment is not limited to a medium independent from the computer or the embedded system, and may be a recording medium which downloads the program transferred through a LAN or the Internet, and stores or temporarily stores the program. In addition, the number of recording mediums is not limited to "1". Even a case where the process in this embodiment is performed from a plurality of recording mediums is also included in the case of the recording medium in this embodiment, and any configuration of the medium may be employed.

Further, the computer or the embedded system in this embodiment performs the respective processes in this embodiment based on the program stored in the recording medium, and may be configured by any one of a device such as a personal computer or a microcomputer and a system where a plurality of devices are connected through a network. In addition, the computer in this embodiment is not limited to the personal computer, and includes an arithmetic processing device included in an information processing apparatus, and a microcomputer. The computer in this embodiment collectively refers to an apparatus or a device which can realize the functions in this embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noise reduction apparatus, comprising:
a speaker that outputs control sound;
a generator that generates self-excited sound; and
a controller that controls a phase and an amplitude of the control sound to reduce noise generated from a noise source, based on the control sound and the self-excited sound that is synchronized with the control sound by a lock-in phenomenon.

2. The apparatus according to claim 1, wherein the noise is generated by rotation of a rotor blade, and
wherein the generator has a shape of a generation structure of the self-excited sound which is determined based on a flow velocity caused by rotation of the rotor blade, a rotation velocity of the rotor blade, and a number of blades of the rotor blade.

3. The apparatus according to claim 2, wherein the generator has a cavity structure, and the speaker is arranged at the noise source side relative to the generator.

4. The apparatus according to claim 3, wherein the cavity structure is adjusted to satisfy $k/d=B/60$, wherein d is a length of the cavity structure parallel to an air supply direction, B is a number of blades of the rotor bade, and k is a constant number based on the flow velocity and the rotation velocity.

5. The apparatus according to claim 2, wherein the generator has an edge structure, and the generator is arranged at the noise source side relative to the speaker.

6. The apparatus according to claim 5, wherein the edged structure is adjusted to satisfy $k/2d=B/60$, wherein d is a distance between a distal end of the edge structure and a member present on an extension of the distal end, B is a number of blades of the rotor bade, and k is a constant number based on the flow velocity and the rotation velocity.

7. The apparatus according to claim 1, wherein a plurality of pairs of the generator and the speaker are arranged along a circumferential direction of an inner wall of a duct including the noise source, and in front of or behind the noise source in a tube axis direction of the duct.

8. A jet fan, comprising:

a tubular housing;

a rotor blade arranged in the tubular housing and including a plurality of blades;

a stator blade straightening airflow generated by rotation of the rotor blade; and a plurality of noise reduction apparatuses arranged in a circumferential direction of an inner wall of the housing and in front of or behind the rotor blade in a tube axis direction of the tubular housing, at least one of the plurality of noise reduction apparatuses comprising:

a speaker that outputs control sound;

a generator that generates self-excited sound; and a controller that controls a phase and an amplitude of the control sound to reduce noise generated from a noise source, based on the control sound and the self-excited sound that is synchronized with the control sound by a lock-in phenomenon.

\* \* \* \* \*